United States Patent Office  2,894,926
Patented July 14, 1959

2,894,926

RUBBERY DIENE SYNTHETIC ELASTOMER COMPOSITION

Larry Jacobson, Painesville, Ohio, assignor to Diamond Alkali Company, Cleveland, Ohio, a corporation of Delaware No Drawing. Application August 2, 1954
Serial No. 447,397

23 Claims. (Cl. 260—28.5)

This invention relates to synthetic elastomer compositions of improved tensile strength and tear resistance, as well as improved processing and loading qualities.

The term "synthetic elastomer" as used herein is that commonly used in the rubber compounding art to designate those synthetic organic polymers and copolymers having appreciable olefinic unsaturation remaining in the molecules thereof after polymerization, so as to render such polymer and copolymer materials vulcanizable under the influence of a vulcanizing agent in conjunction with heat and pressure. These polymers may be further characterized by their ability, in the vulcanized state and in the form of a standard test piece, to be stretched to at least twice the original length of such test piece, and upon removal of the stress after such stretching to return to approximately the original length within a short time.

Such synthetic elastomers are exemplified by polymers of butadiene and copolymers of butadiene and styrene, copolymers of butadiene and acrylonitrile, and copolymers of isobutylene and butadiene, copolymers of isobutylene and 2-methyl butadiene (isoprene), and copolymers of 2-chlorobutadiene and styrene (chloroprene). The proportions of the various components of the copolymer mixtures and their effect upon the physical properties of the elastomers are well-understood in the art.

This application is a continuation-in-part of my co-pending application Ser. No. 288,327, filed May 16, 1952, now abandoned.

It has heretofore been proposed to combine specific chlorinated organic materials in specific amounts with various plastic materials for such purposes as flameproofing the plastic material, for preventing scorching of vulcanizable synthetic elastomers, and for plasticizing various synthetic plastics.

In the flameproofing of plastic materials, the proposals heretofore made for the incorporation of chlorinated organic compounds have been limited to the combination consisting essentially of a given plastic material with a mixture of a chlorinated organic compound plus an inorganic flame-retardant substance, such as salts of antimony, arsenic, and bismuth, as well as oxides of these elements. Obviously, versatility of such compositions is not one of their virtues, and this is requisite particularly in the art of manufacturing mechanical rubber goods which find a wide variety of uses.

The proposed methods to employ a chlorinated organic material, particularly chlorinated paraffin wax, to prevent "scorching" during the processing of synthetic elastomer compositions containing carbon black, required only very small amounts of the chlorinated paraffin wax to overcome the effects of high pH of the carbon black fillers. Whatever the virtues of such methods may be, it has been found that little other than the prevention of scorching is accomplished.

Similarly, in the flameproofing of synthetic elastomers, the prior proposals have been directed to the use of comparatively small amounts of highly chlorinated paraffin wax together with inorganic flameproofing ingredients. The loading or amounts of inorganic flameproofing materials, to be used in such compositions, in accordance with these proposals, has been well under 100% of the synthetic elastomers employed; changes in the physical properties, other than flameproofing, resulting from the use of the combination of highly chlorinated paraffin wax with inorganic filler materials, have not shown marked improvement. In fact, in accordance with certain of these proposals, the physical properties of the compositions have generally shown a decrease, in that tensile strength, tear resistance, and hardness, have been impaired, at the expense of acquiring only flame resistance or flameproofing of the compositions.

The proposed compositions for employing chlorinated organic materials, particularly chlorinated paraffin wax containing from 35%–55% of chemically combined chlorine, have not been found to be the equivalents, nor to impart the same physical properties to synthetic elastomer vulcanizates, as the compositions of the present invention.

One of the objects of the present invention is to provide synthetic elastomer compositions of greater versatility than the compositions heretofore proposed in the art of compounding and manufacturing such compositions.

Another object of the invention is to provide synthetic elastomer compositions having a greater loading capacity with respect to pigments of the reinforcing type, and fillers commonly employed in this art.

A further object of the invention is to provide synthetic elastomer compositions, particularly those containing the butadiene-styrene copolymers, requiring less milling time to incorporate reinforcing pigments, and fillers, than has heretofore been experienced in the art.

A still further object of the invention is to provide synthetic elastomer compositions in which shrinkage after milling is substantially negligible.

Another object of the invention is to provide synthetic elastomer compositions of improved physical properties containing highly chlorinated paraffin wax and a high proportion of filler materials relative to the amount of synthetic elastomer in the composition.

These and other objects will be apparent from the description of the invention provided hereinbelow.

As a basis for the objects of the invention, it has now been found that chlorinated paraffin wax containing from 65%–75% of chemically combined chlorine, when included in synthetic elastomer compositions of the above-described class, and containing inert inorganic fillers or reinforcing pigments, or both, to the extent of 100%, or more, of the elastomer, impart several highly desirable properties to such compositions.

For example, in the processing of synthetic elastomer compositions, particularly those containing butadiene-styrene copolymers, and inert inorganic loading materials, such as fillers and reinforcing pigments, to the extent of 100%, or more, of the elastomer, and chlorinated paraffin wax (65%–75% of chemically combined chlorine), the time required to incorporate the loading materials into the mix (the so-called "milling time") may be reduced to an interval amount to about one-half of that required to accomplish the same degree of dispersion with the same amount of loading in the synthetic elastomer composition when the chlorinated paraffin wax containing from 65%–75% of chemically combined chlorine is not present in an amount within the scope of the present invention. Moreover, in mixing stocks for molded mechanical goods, wherein a relatively high degree of loading is either required or desirable, i.e., above about 300% of the elastomer, it has been found that incorporating a proper amount of highly chlorinated paraffin wax, as above specified, not only results in the stock being more easily processed, but also it is possible by the incorporation of the proper amount of such highly chlorinated paraffin wax to obtain a much higher loading of the milled stock without impairing substantially either the tensile strength or the tear resistance of the vulcanizate obtained from such stock. In addition, these stocks, as well as those with a lesser degree of loading, are more readily extruded and calendered than stocks having the same degree of loading but lacking the highly chlorinated paraffin wax.

Where the degree of loading of the synthetic elastomer stocks is of the order of 100% to 200% of the elastomer, it has been found that incorporating a proper amount of the highly chlorinated paraffin wax, as above specified, in addition to accelerating the rate at which the fillers and reinforcing pigments are dispersed in the stock, also results in the stock adhering less strongly to the processing equipment. The shrinkage of the loaded and unloaded milled stocks is also substantially negligible, i.e., dimensional stability of the uncured stock is assured under normal storage conditions in the interim between milling and the molding of the stock. Moreover, a vulcanizate is obtained which has higher tensile strength and improved tear resistance, without loss of elasticity, than is obtained from a stock containing the same ingredients in the same amounts without the highly chlorinated paraffin wax.

Commensurate with these findings, the present invention is directed to synthetic elastomer compositions of improved processing properties, high tensile strength, and improved tear resistance, including a vulcanizable synthetic elastomer, as defined above, a vulcanizing agent for said elastomer, a vulcanization accelerator for said agent, an inert inorganic loading material having an average particle size substantially within the range of from 0.02 micron to 15 microns, the weight ratio of said loading material to said elastomer being substantially within the range of 1:1 to 3.5:1, and chlorinated paraffin wax having between 65%–75% of chemically combined chlorine, the weight ratio of said chlorinated paraffin wax to the said elastomer being substantially within the range of 1:20 to 1:1.

In the manufacture of the compositions of the present invention, the general principles of the methods heretofore employed in the art for obtaining natural and synthetic rubber stocks are followed. For example, the mill or mixer, such as a 2-roll mill or a Banbury mixer, initially is brought to a suitable temperature for softening and masticating the elastomer prior to physically combining the dry loading ingredients with the elastomer. For this purpose, a temperature, such as 210° F., plus or minus 5°–10°, is ordinarily suitable. The elastomer is then masticated for a period sufficient to render the same tacky and readily flowable under pressure. The time required to bring the synthetic elastomer to this condition will vary according to the nature of the polymer or copolymer employed. After the proper degree of breakdown of the elastomer has been obtained, it is common practice to add to the elastomer any plasticizer or plasticizers which may, for one reason or another, be desirable, depending upon the ultimate use to which the vulcanizate obtained from the stock is put. At the same time, any anti-oxidant material which may be desirable in the stock or in the ultimate vulcanizate is added. Thereafter, vulcanization activators, such as zinc oxide, and accelerators which may be derivatives of carbon bisulfide, such as mercaptobenzothiazol, benzothiazol disulfide, tetramethyl thiuram monosulfide, and the like, derivatives of guanidine, such as diphenyl guanidine, di-orthotolyl guanidine, and the like, as well as aldehyde-aromatic amine derivatives, are added. When all of these ingredients have been thoroughly dispersed in the masticated mass, the inert inorganic fillers and reinforcing pigments are added to the mass on the rolls or in the mixer. Following the dispersion of the fillers and the reinforcing pigments in the batch, the vulcanization agent, such as elemental sulfur, is added and thoroughly dispersed therein, after which the batch is removed from the mill and prepared for molding.

The chlorinated paraffin wax containing from 65%–75% of chemically combined chlorine, as specified herein, may be incorporated into the elastomer stock along with the plasticizer and anti-oxidant in the second step of the conventional method described above, or it may be separately mixed with the inorganic fillers and reinforcing pigments, preferably as a dry comminuted power, and this mixture added to the stock being milled. It has also been found advantageous to combine the solid, preferably comminuted, chlorinated paraffin wax with the tire for the drill extending therethrough toward the fillers and reinforcing pigments either by passing the mixture of chlorinated paraffin wax and filler or pigment through a hammer mill, or by ball milling the mixture prior to adding the same to the elastomer stock.

Because of the relatively high temperatures and pressures encountered in the milling operation, as well as in the molding of the milled stock to obtain a vulcanizate from such elastomer compositions, it is preferably to add a stabilizer for the chlorinated paraffin wax to the compositions of the present invention. This may be accomplished by mixing the chlorinated paraffin wax with a suitable stabilizer and adding this mixture either to the elastomer stock during the milling thereof, or to the mixture of filler and reinforcing pigment; also, the stabilizer for the chlorinated paraffin wax may be added to the stock along with the chlorinated paraffin wax, fillers, and pigments without prior mixing. Suitable stabilizers for this purpose include ester salts, such as alkali metal organo-phosphates, organo-metallic salts, such as dibutyl tin maleate, heavy metal soaps, such as cadmium and strontium soaps, barium and cadmium laurates, barium ricinoleate, and the like; and inorganic compounds, such as dibasic lead phosphite, basic lead silicate-sulfate (double salt type), and the like.

In addition to the above ingredients, it is desirable to incorporate in the elastomer stock a slightly greater amount of accelerator than is normally employed, for the reason that the chlorinated paraffin wax is characteristically slightly acid and, therefore, tends to retard the rate of vulcanization even in admixture with the normal amount of vulcanization accelerators.

The inert inorganic loading material, comprising one or more fillers and reinforcing pigments, used in the compositions of the present invention includes barium sulfate, calcium carbonate, calcium silicate, calcium sulfate, magnesium carbonate, magnesium silicate, aluminum silicate, the natural complex aluminum silicates known as "clays," silica, magnesium oxide, zinc oxide, zinc sulfide, and like materials. Zinc oxide, in addition to being a filler material, is also a vulcanization activator for the accelerator and vulcanizing agents normally employed in elastomer stocks.

Carbon black, as well as certain members of the above group, are also regarded as reinforcing, and semi-reinforcing, pigments when the ultimate particle size of such materials has been reduced to less than 1 micron. Such materials include the hard clays, the alkaline earth silicates, silica flour, titanium dioxide, (known in the rubber compounding art as "white carbon black"), as well as calcium sulfate, and calcium and magnesium carbonates. The other members of the group of loading materials noted above may have particles within and without the range of 0.02–1 micron, with a greater proportion of the particles above 1 micron. These materials, such as ground limestone (5–15 microns), the soft clays having an average particle size above 2 microns, and the like are regarded as fillers without reinforcing properties.

The amount of loading material to be incorporated into a given mix may vary from about 100 parts by weight to about 350 parts by weight per 100 parts by weight of synthetic elastomer. Maximum utility of the chlorinated paraffin wax is obtained in the more highly loaded formulations where the dispersing effect of the chlorinated paraffin wax upon the loading materials is evidenced by a shorter milling time (of the order of one-half) required to incorporate the loading material into a given mix, uniformity, of the dispersion of loading material in the elastomer as evidenced by the absence of aggregates of particles of loading material in the mix, as well as higher tensile strength and improved tear resistance obtained in the vulcanizates, as compared to equal loadings without the chlorinated paraffin wax. This dispersing effect is, in general, especially notable in formulations having weight ratios of loading material to elastomer above 1:1, i.e., where the weight of the loading material exceeds the weight of elastomer; the reinforcing effect of certain loading materials, such as carbon black, is augmented in the vulcanizates of the compositions of the present invention at ratios within the ranges given above.

Certain inert inorganic compounds which impart color to the elastomer stocks, such as ferric oxide, antimony sulfide, titanium dioxide, zinc sulfide, and chromium sesquioxide, may also be employed. The amount of these materials to be used in any given mix is necessarily dependent upon the ability of the particular material to impart the desired shade of color to the elastomer stock.

In addition to these materials, organic dyes may also be incorporated in the stock to impart the desired shade or color to the vulcanizate.

In order that those skilled in the art may better understand the present invention and in what manner the compositions thereof may be obtained, the following specific examples are offered:

In the examples, the data for tensile stress, or modulus, and tensile strength are given in pounds per square inch, and the tear resistance is given in pounds per inch of thickness. The test specifications are fully set forth in the American Society for Testing Materials "Standard Methods of Testing," designations D412-41 and D624-44, respectively.

EXAMPLE I

A butadiene-styrene copolymer is used as the synthetic elastomer. This material contains 20% of "bound" styrene, the particles of the synthetic elastomer being coated with a fatty acid material to the extent of about 6% of the copolymer. This material has been disclosed in the art under the designation of GR-S-X630.

The method of processing the mix is substantially that set forth in the forepart of this specification.

Table 1

| Basic formula: | Parts by weight |
|---|---|
| GR-S-X630 | 100 |
| ZnO | 5 |
| Stearic acid | 1 |
| Benzothiazol disulfide | 1.5 |
| Cu-diethyl-dithiocarbamate | 0.15 |
| Sulfur | 2.5 |

| To batch No | (1) | (2) | (3) | (4) |
|---|---|---|---|---|
| Add: Chlorinated paraffin wax (69%-71%Cl) | 0 | 10 | 20 | 30 |
| Cure—20 min. at 307° F.: | | | | |
| Tensile Stress— | | | | |
| At 200% elongation | 140 | 110 | 120 | 100 |
| At 300% elongation | 250 | 310 | 260 | 200 |
| Tensile Strength— | | | | |
| At break point | 260 | 350 | 330 | 320 |
| Percent Elongation at Break | 320 | 320 | 360 | 395 |
| Tear Resistance | 35 | 37 | 37 | 33 |

It will be observed that this is a simple formulation involving a synthetic elastomer, and zinc oxide as a filler and vulcanization activator, with the usual vulcanization accelerators and vulcanizing agent. Also, it will be noted that from this formulation, there is a definite reinforcing effect to be obtained by the addition to the stock of as little as 10 parts by weight of a chlorinated paraffin wax (comminuted) containing between 69%–71% of chemically combined chlorine per 100 parts by weight of synthetic elastomer.

EXAMPLE II

Following the same procedure as that employed in Example I, the basic formula of Example I is augmented by the addition thereto of calcium carbonate having a particle size sufficiently small to be regarded as a reinforcing pigment, together with a larger size particle size calcium carbonate suitable for use as a filler material. The amount of calcium carbonate is well over "the critical amount" for the reinforcing pigment used. That is, in the type of formulation given below, increasing the amount of calcium carbonate (reinforcing grade) up to about 125 parts per 100 parts of the copolymer used causes an increase in tensile strength and tear resistance; however, beyond this critical amount the tensile strength decreases until the amount of reinforcing calcium carbonate filler reaches about 175 parts per 100 parts of copolymer, and then shows little further decrease at loadings substantially above this amount. The decrease in tensile strength, however, as is shown in the table below, may not be sufficiently great to bring the value down to, or below, the value for the unfilled stock.

Table 2

| Basic formula: | Parts by weight |
|---|---|
| GR-S-X630 | 100 |
| ZnO | 5 |
| Stearic acid | 1 |
| Benzothiazol disulfide | 1.5 |
| Cu-diethyl-dithiocarbamate | 0.15 |
| Sulfur | 2.5 |

| To batch No | (5) | (6) | (7) | (8) |
|---|---|---|---|---|
| Add: | | | | |
| CaCO₃ (0.05-0.06 mu) | 175 | 175 | 175 | 175 |
| CaCO₃ (1 mu.) (Stearic acid coated) | 25 | 25 | 25 | 25 |
| Glyceryl tri-ester | 5 | | | |
| Chlorinated paraffin wax (69%-71% Cl) | | 5 | 10 | 20 |
| Cure—20 min. at 307° F.: | | | | |
| Tensile Stress— | | | | |
| At 300% elongation | 350 | 400 | 430 | 350 |
| At 500% elongation | | | 760 | 700 |
| Tensile Strength— | | | | |
| At break point | 520 | 700 | 760 | 900 |
| Percent Elongation at Break | 390 | 480 | 500 | 600 |
| Tear Resistance | 71 | 101 | 107 | 131 |

It will be noted from the above formula that first of all, the addition of a reinforcing pigment to the basic formula of Example I adds considerably to the tensile strength and tear resistance of such composition. In addition, it will be noted, when comparing the tensile strength at the break point for the various compositions, as well as the tear resistance thereof, that there is a striking increase in the tensile strength at the break point for those compositions containing as little as 5 parts of chlorinated paraffin wax (69%–71% of chemically combined chlorine), and that the tensile strength at the break point further increases as the amount of chlorinated paraffin wax increases in proportion to the amount of synthetic elastomer in the stock. The data for tear resistance in the above table also bring out strikingly the increase in the tear resistance of the cured compositions as the amount of chlorinated paraffin wax is increased in proportion to the amount of synthetic elastomer in the stock, while the amounts of the reinforcing pigment and the filler material are kept constant.

EXAMPLE III

Employing the same synthetic elastomer as that employed in Example I above, and employing the method of combining the ingredients as described hereinabove, the loadings of the formula for Example II are increased substantially, and to the basic formula, for the purposes of comparison, there is added a resinous copolymer of cumarone-indene, an art-recognized plasticizer and processing aid for butadiene-styrene copolymers and used very widely in this art for the purpose. Methods of compounding these compositions are substantially the same as those employed in the previous examples.

Table 3

Basic formula: Parts by weight
GR-S-X630 _____ 100
ZnO _____ 5
Stearic acid _____ 1
Benzothiazol disulfide _____ 1.5
Cu-diethyl-dithiocarbamate _____ 0.15
Sulfur _____ 2.5

| To batch No. | (9) | (10) | (11) | (12) |
|---|---|---|---|---|
| Add: | | | | |
| CaCO₃ (0.05–0.06 mu) | 200 | 250 | 200 | 250 |
| CaCO₃ (1 mu) | 50 | 50 | 50 | 50 |
| Chlorinated paraffin wax (69%–71% Cl) | | | 20 | 20 |
| Cumarone-indene (resinous copolymer) | 20 | 20 | | |
| Cure—20 min. at 307° F.: | | | | |
| Tensile Stress— | | | | |
| At 200% elongation | | | 520 | 760 |
| At 300% elongation | 400 | 670 | 660 | 870 |
| Tensile Strength— | | | | |
| At break point | 1,020 | 880 | 920 | 870 |
| Percent Elongation at Break | 510 | 385 | 455 | 300 |
| Tear Resistance | 142 | 155 | 157 | 181 |

It will be noted from the above table that when the loading of the composition is increased to an amount ranging from 250–300 parts of the reinforcing pigment and the filler per 100 parts of synthetic elastomer, both with the cumarone-indene copolymer and with the chlorinated paraffin wax, a substantial increase in the tensile strength of the cured composition is obtained, over the compositions without either chlorinated paraffin wax or cumarone-indene copolymer. The tensile strength at the break point for all four of these compositions is of the same order of magnitude, but with a substantial increase in the tear resistance of the composition containing the highest loading and 20 parts of chlorinated paraffin wax (69%–71% Cl) per 100 parts of the synthetic elastomer. In addition, and a fact which is not noted in the table, there is a substantial decrease in the milling time of the compositions containing the chlorinated paraffin wax; specifically, the milling time is reduced by about one-half of the milling time required for the composition containing the cumarone-indene copolymer.

EXAMPLE IV

The synthetic elastomer employed is GR–S 100, a butadiene-styrene copolymer well-known in the art of rubber compounding. This material is a low temperature polymerizate containing about 6% rosin acid. The formulae in the tables below show the effect of adding chlorinated paraffin wax (69%–71% Cl) to a simple formulation such as that shown in Example I above, and to a filled formulation such as that shown in Example II above. In the filled formulations, it is to be noted particularly that the filling agent is of a relatively coarse texture when compared with so-called reinforcing agents, and that the amount of the loading material used is well past the critical amount as noted by comparing the tensile strength values of the filled and unfilled compositions.

Table 4

Basic formula: Parts by weight
GR–S 100 _____ 100
ZnO _____ 5
Stearic acid _____ 1
Benzothiazol disulfide _____ 1.5
Tetramethyl thiuram disulfide _____ 0.25
Sulfur _____ 2.5

| To batch No. | (13) | (14) | (15) | (16) |
|---|---|---|---|---|
| Add: Chlorinated paraffin wax (69%–71% Cl) | | 10 | 20 | 30 |
| Cure—20 min. at 307° F.: | | | | |
| Tensile Stress— | | | | |
| At 200% elongation | 120 | 120 | 100 | 80 |
| At 300% elongation | 190 | 200 | 150 | 130 |
| Tensile Strength— | | | | |
| At break point | 220 | 260 | 250 | 300 |
| Percent Elongation at Break | 330 | 350 | 420 | 485 |
| Tear Resistance | 28 | 32 | 29 | 34 |

From the above physical test data, it is evident that the addition of the chlorinated paraffin wax tends to reinforce the synthetic elastomer vulcanizate (increase in tensile strength and tear resistance), while simultaneously increasing elasticity thereof.

Table 5

Basic formula: Parts by weight
GR–S 100 _____ 100
ZnO _____ 5
Stearic acid _____ 1
Benzothiazol disulfide _____ 1.5
Tetramethyl thiuram disulfide _____ 0.25
CaCO₃ (approx. 5 mu.) _____ 125
Sulfur _____ 2.50

| To batch No. | (17) | (18) | (19) | (20) |
|---|---|---|---|---|
| Add: Chlorinated paraffin wax (69%–71% Cl) | | 10 | 20 | 30 |
| Cure—30 min. at 307° F.: | | | | |
| Tensile Stress— | | | | |
| At 200% elongation | 150 | 160 | 140 | 130 |
| At 400% elongation | 230 | 260 | 250 | 260 |
| Tensile Strength— | | | | |
| At Break point | 230 | 270 | 310 | 330 |
| Percent Elongation at Break | 400 | 420 | 460 | 500 |
| Tear Resistance | 37 | 48 | 45 | 52 |

A comparison of Tables 4 and 5 points up the unusual effect to be obtained by the addition of chlorinated paraffin wax to a physical combination of elastomer and inert inorganic filler material of relatively large particle size. Thus, it will be observed that batch Nos. (13) and (17) show substantially no differences as to tensile strength of vulcanizate at the break point, whereas this value increases markedly in the range of 10–30 parts of the chlorinated paraffin wax per 100 parts of elastomer, all with the same amount of non-reinforcing filler material. Moreover, there is a corresponding increase in the elaasticity and tear resistance of the vulcanizates well above the values of the control batch Nos. (13) and (17).

EXAMPLE V

The formula given in the table below will be recognized as a slight variation of that given in Example III, using GR–S 100, and physical test data show the effect, upon the tensile strength and the tear resistance, of employing as little as 5 parts of chlorinated paraffin wax per 100 parts of the synthetic elastomer and employing substantially less loading material than that of Example III, although the amount of loading material is still well over the critical amount for the copolymer and calcium carbonate used.

Table 6

Basic formula: Parts by weight
GR–S 100 _____ 100
ZnO _____ 5
Benzothiazol disulfide _____ 1.5
Cu-diethyl-dithiocarbamate _____ 0.25
Oil soluble sulfonic acid+paraffin oil _____ 1
CaCO₃ (0.05–0.06 mu.) _____ 175
Sulfur _____ 2.5

| To batch No. | (21) | (22) | (23) | (24) |
|---|---|---|---|---|
| Add: | | | | |
| Cumarone-indene (resinous copolymer) | 5 | 20 | | |
| Chlorinated paraffin wax (69%–71% Cl) | | | 5 | 20 |
| Cure—20 min. at 307° F.: | | | | |
| Tensile Stress— | | | | |
| At 300% elongation | 350 | 380 | 470 | 570 |
| At 500% elongation | 620 | 760 | 730 | 1,060 |
| Tensile Strength— | | | | |
| At break point | 1,030 | 1,620 | 1,160 | 1,525 |
| Percent Elongation at Break | 680 | 705 | 640 | 615 |
| Tear Resistance | 162 | 208 | 173 | 230 |

With this amount of loading, it will be observed that the chlorinated paraffin wax material very definitely exerts a reinforcing effect upon the mixture of inorganic loading material and synthetic elastomer, equivalent at least to that of the cumarone-indene copolymer, and again with an increase in the tear resistance of the vulcanizate over one employing the resinous cumarone-indene copolymer.

EXAMPLE VI

There is employed a butadiene-acrylonitrile copolymer designated by the manufacturer (The B. F. Goodrich Company) as Hycar, with further designation to indicate oil resistance and easy processing. Also, a semi-reinforcing "furnace black," and a high modulus "furnace black," are employed as the filler materials, and it will be noted that a large proportion of chlorinated paraffin wax (69%–71% of chemically combined chlorine) is employed relative to the amount of the synthetic elastomer material.

The antimony oxide noted in the tables below is present for the purpose of imparting flame-retarding properties to the mix, since these formulae are representative of flame-resistant wire coating compositions.

Table 7

| Basic formula: | Parts by weight |
|---|---|
| Hycar or 25 EP | 100 |
| ZnO | 5 |
| Mercaptobenzothiazol | 1.5 |
| Stearic acid | 0.5 |
| Sulfur | 2.5 |

| To batch No | (25) | (26) | (27) | (28) | (29) |
|---|---|---|---|---|---|
| Add: | | | | | |
| Cumarone-indene (resinous copolymer) | 15 | 15 | | 15 | |
| Dibutylphthalate | 15 | 15 | | 15 | |
| Furnace black (semi-reinforcing) | 60 | 100 | 100 | | |
| Furnace black (0.02 mu) ("high modulus") | | | | 125 | 125 |
| Chlorinated paraffin wax (69%–71% Cl) | | | 85 | | 85 |
| Antimony oxide (Sb$_2$O$_3$) | | | 15 | | 15 |
| Cure—60 min. at 287° F.: | | | | | |
| Tensile Stress— | | | | | |
| At 100% elongation | | 1,220 | 1,420 | | |
| At 200% elongation | 820 | | | | |
| At 300% elongation | 1,400 | | | | |
| Tensile Strength— | | | | | |
| At break point | 1,940 | 1,900 | 2,780 | 1,660 | 2,080 |
| Percent Elongation at Break | 475 | 150 | 195 | 135 | 155 |
| Tear Resistance | 195 | 230 | 310 | 232 | 265 |

It will be noted that the critical amount of loading for the semi-reinforcing furnace black is about 100 parts per 100 parts of copolymer, and that the relatively high proportion of chlorinated paraffin wax causes an unusual increase in the tensile strength value at the critical amount of loading material, thus, again emphasizing the substantial reinforcing effect obtained from the chlorinated paraffin wax. When the critical amount of loading is lower, as with the high modulus furnace black, and this critical amount is considerably exceeded, as in batches 28 and 29, the reinforcing effect of chlorinated paraffin wax is still very much in evidence.

EXAMPLE VII

The physical test data obtained from elastomer compositions containing "neoprene W" (a general purpose polymer of 2-chlorobutadiene) given in the table below show the plasticizing effect of chlorinated paraffin wax having less than 65% of chemically combined chlorine, in contrast with the reinforcing effect of chlorinated paraffin wax having more than 65% of chemically combined chlorine.

Table 8

| Basic formula: | Parts by weight |
|---|---|
| Neoprene W | 100.00 |
| MgO (extra light) | 2.00 |
| ZnO | 5.00 |
| 2-mercaptoimidazoline | 0.50 |
| Phenylbetanaphthylamine | 1.00 |
| Light process oil | 30.00 |
| Stearic acid | 0.50 |
| Furnace black (semi-reinforcing) | 130.00 |
| CaCO$_3$ (avg. 1 micron) | 100.00 |

| To batch No | (30) | (31) | (32) | (33) |
|---|---|---|---|---|
| Add: Chlorinated paraffin wax— | | | | |
| 60%–62% Cl | 30 | 50 | | |
| 69%–71% Cl | | | 30 | 50 |
| Cure—30 min. at 307° F.: | | | | |
| Tensile Stress— | | | | |
| At 200% elongation | 1,030 | 660 | 1,550 | 1,380 |
| At 300% elongation | 1,200 | 970 | | |
| Tensile Strength— | | | | |
| At break point | 1,220 | 1,150 | 1,630 | 1,620 |
| Percent Elongation at Break | 310 | 455 | 240 | 290 |
| Tear Resistance | 254 | 247 | 276 | 285 |
| Shore "A" Hardness | 82 | 72 | 85 | 82 |

It will be noted from the physical data of the above table that while the tensile strength of the three compositions at the break point is substantially the same, the formulae containing the chlorinated paraffin wax are shown to be appreciably more elastic than the material obtained by the representative formula.

EXAMPLE VIII

The formula for this example is representative of a table-top backing. The amount of chlorinated paraffin wax incorporated in this formula is increased up to a maximum of 40 parts of the chlorinated paraffin wax per 100 parts of rubber (synthetic elastomer + whole tire reclaim containing 50% rubber hydrocarbon). Also, it will be noted from the data in this table that there is an increase in the tensile strength at the break point, as well as an increase in the tear resistance, when suitable amounts of the chlorinated paraffin wax are incorporated in the formula, with the degree of loading considerably over the critical amount.

Table 9

| Basic formula: | Parts by weight |
|---|---|
| GR–S | 60 |
| Whole tire reclaim (50% rubber hydrocarbon) | 80 |
| Limestone (avg. 10 microns) | 60 |
| Mineral rubber | 20 |
| ZnO | 3 |
| Benzothiazol disulfide | 1.25 |
| Tetramethyl thiuram monosulfide | 0.5 |
| Stearic acid | 2 |
| Light process oil | 1 |
| Sulfur | 3.5 |

| To batch No | (34) | (35) | (36) | (37) | (38) |
|---|---|---|---|---|---|
| Add: | | | | | |
| Dixie Clay | 60 | 70 | 75 | 75 | 75 |
| Furnace black (semi-reinforcing) | 85 | 95 | 100 | 115 | 125 |
| Chlorinated paraffin wax (69% Cl) | 20 | 30 | 40 | 40 | 40 |
| Cure—20 min. at 287° F.: | | | | | |
| Tensile Stress— | | | | | |
| At 100% elongation | 640 | 700 | 700 | 870 | 1,000 |
| At 200% elongation | 1,030 | 1,030 | 1,050 | 1,270 | |
| Tensile Strength— | | | | | |
| At break point | 1,120 | 1,150 | 1,160 | 1,270 | 1,270 |
| Percent Elongation at Break | 240 | 230 | 250 | 200 | 145 |
| Tear Resistance | 153 | 148 | 177 | 171 | 178 |

EXAMPLE IX

In the following table the recipes and the physical test data illustrate the use of two elastomers in compositions within the scope of the present invention, and certain of the physical properties of such composition. The recipes are for compositions containing butadiene-styrene, and butadiene acrylonitrile, copolymers in combination with "neoprene," and having better low temperature flexibility than would be obtained by the use of either of the above copolymers alone. Notable also is the low "durometic" hardness, coupled with comparatively high tensile strength and flame resistance.

The elastomers used are "neoprene WRT" (a stabilized polymer of 2-chlorobutadiene), "GR–S 1502" (a butadiene-styrene, "low temperature," copolymer, containing an antioxidant), and a butadiene acrylonitrile copolymer designated by the manufacturer (The B. F.

Goodrich Company) as "Hycar" with a further designation to indicate oil resistance and easy processing.

Table 10

|  | Parts by Weight | |
| --- | --- | --- |
| Batch No | (39) | (40) |
| Neoprene WRT | 33.30 | 33.30 |
| GR-S 1502 | 66.70 |  |
| HYCAR OR 25 EP |  | 66.70 |
| Silica (0.02 micron) | 25.00 |  |
| Calcium Stearate | 2.00 |  |

To each batch there is added: 70 parts chlorinated paraffin wax (69%–71% Cl), 40 parts chlorinated paraffin wax (40%–42% Cl), 10 parts antimony oxide, 10 parts triphenyl phosphate, 0.5 part stearic acid, 1.0 part s-di-(b-naphthyl-p-phenylenediamine), 1.5 parts light calcined magnesia, 5 parts ZnO, 0.2 part 2-mercaptoimidazoline, 1.5 parts benzothiazole disulfide, 0.3 part tetramethylthiuram disulfide, 3 parts sulfur, 1 part triethanolamine, 2 parts of a sodium organophosphate, 50 parts calcium carbonate (avg. 0.05 micron), 50 parts Suprex clay (avg. 2 microns), and 2 parts of resinous internal lubricant.

| Physical Properties | (39) | (40) |
| --- | --- | --- |
| Cure—30 min. at 307° F.— | | |
| Tensile Stress: At 300% elongation | 350 | 1,060 |
| Tensile Strength: At break point | 1,790 | 1,410 |
| Percent Elongation at Break | 750 | 405 |
| Tear Resistance | 149 | 160 |
| Hardness | 52 | 62 |

EXAMPLE X

In the following table there is given a recipe for a mixture containing a "high temperature" copolymer of butadiene and styrene (GR-S 1001), and a general purpose 2-chlorobutadiene polymer, designated "neoprene W." The composition is representative of a gray flameproof deck covering for ships, in which composition part of the flameproof properties are derived from the 2-chlorobutadiene polymer.

Table 11

| | |
| --- | --- |
| GR-S 1001 Parts by weight | 50.00 |
| Neoprene W do | 50.00 |
| Chlorinated paraffin wax (69%–71% Cl) do | 85.00 |
| Antimony oxide do | 50.00 |
| Zinc oxide do | 5.00 |
| Light calcined magnesia do | 2.00 |
| Diphenylguanidine do | 1.50 |
| Tetramethyl thiuram disulfide do | 1.00 |
| Benzothiazole disulfide do | 1.50 |
| s-di-(b-naphthylamine-p-phenylenediamine) do | 1.75 |
| Cd-Ba oleate do | 0.85 |
| Stearic acid do | 0.50 |
| Titanium dioxide do | 9.00 |
| Furnace black (for gray coloration) do | 0.65 |
| Triethanolamine do | 2.00 |
| Calcium carbonate (1 micron) do | 100.00 |
| Suprex clay (1 micron) do | 100.00 |
| Sulfur do | 2.00 |
| Physical properties: Cure—20 min. at 307° F.— | |
| Tensile stress: | |
| At 200% elongation | 820 |
| At 300% elongation | 1050 |
| At 400% elongation | 1230 |
| Tensile strength: At break point | 1230 |
| Elongation at break | 400 |
| Tear resistance | 210 |
| Hardness | 80 |

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A synthetic elastomer composition of improved processing qualities, high tensile strength and improved tear resistance, including a vulcanizable rubbery diene synthetic elastomer material, a vulcanizing agent for said elastomer, a vulcanization accelerator for said agent, an inert inorganic loading material having an average particle size substantially within the range of from 0.02 micron to 15 microns, the weight ratio of said loading material to said elastomer material being substantially within the range of from 1:1 to 3.5:1, and a solid chlorinated paraffin wax having between 69% and 71%, inclusive, of chemically combined chlorine, the weight ratio of said chlorinated paraffin wax to said elastomer portion being substantially within the range of 1:20 to 1:1.

2. The composition of claim 1 in which the vulcanizable synthetic elastomer material is a copolymer of butadiene and styrene.

3. The composition of claim 1 in which the vulcanizable synthetic elastomer material is a copolymer of butadiene and acrylonitrile.

4. The composition of claim 1 in which the vulcanizable synthetic elastomer material is a copolymer of butadiene and isobutylene.

5. The composition of claim 1 in which the vulcanizable synthetic elastomer material is a polymer of butadiene.

6. The composition of claim 1 in which the synthetic elastomer material is a mixture of synthetic elastomers.

7. A synthetic elastomer composition of improved processing qualities, high tensile strength and improved tear resistance, including a vulcanizable rubbery diene synthetic elastomer material, a vulcanizing agent for said elastomer, a vulcanization accelerator for said agent, an inert inorganic loading material having an average particle size substantially within the range of from 0.02 to 1 micron, the weight ratio of said loading material to said elastomer material being substantially within the range of 1:1 to 3.5:1, and a solid chlorinated paraffin wax having between 69% and 71%, inclusive, of chemically combined chlorine, the weight ratio of said chlorinated paraffin wax to said elastomer being substantially within the range of from 1:20 to 1:1.

8. The composition of claim 7 in which the vulcanizable synthetic elastomer material is a copolymer of butadiene and styrene.

9. The composition of claim 7 in which the vulcanizable synthetic elastomer material is a copolymer of butadiene and acrylonitrile.

10. The composition of claim 7 in which the vulcanizable synthetic elastomer material is a copolymer of butadiene and isobutylene.

11. The composition of claim 7 in which the vulcanizable synthetic elastomer material is a polymer of butadiene.

12. The composition of claim 7 in which the synthetic elastomer material is a mixture of synthetic elastomers.

13. A synthetic elastomer composition of improved processing qualities, high tensile strength, and improved tear resistance, including a vulcanizable rubbery diene synthetic elastomer material, a vulcanizing agent for said elastomer, a vulcanization accelerator for said agent, an inert inorganic loading material having an average particle size substantially within the range of 2–15 microns, the weight ratio of said loading material to said elastomer material being substantially within the range of 1:1 to 3.5:1, and a solid chlorinated paraffin wax having between 69% and 71%, inclusive, of chemically combined chlorine, the weight ratio of said chlorinated paraffin wax to said elastomer material being substantially within the range of 1:20 to 1:1.

14. The composition of claim 13 in which the vulcanizable synthetic elastomer material is a copolymer of butadiene and styrene.

15. The composition of claim 13 in which the vulcanizable synthetic elastomer material is a copolymer of butadiene and acrylonitrile.

16. The composition of claim 13 in which the vulcanizable synthetic elastomer material is a copolymer of butadiene and isobutylene.

17. The composition of claim 13 in which the vulcanizable synthetic elastomer material is a polymer of butadiene.

18. The composition of claim 13 in which the synthetic elastomer material is a mixture of synthetic elastomers.

19. A synthetic elastomer composition of improved processing qualities, high tensile strength and improved tear resistance, including a vulcanizable synthetic elastomeric copolymer material of butadiene and styrene, a vulcanizing agent for said copolymer, a vulcanization accelerator for said agent, calcium carbonate having a particle size substantially within the range of from 0.02 micron to 1 micron, the weight ratio of said calcium carbonate to said copolymer being substantially within the range of 1:1 to 3:1, and a solid chlorinated paraffin wax having 69% and 71%, inclusive of chemically combined chlorine, the weight ratio of said chlorinated paraffin wax to said copolymer being substantially within the range of 1:20–1:3.

20. A synthetic elastomer composition of improved processing qualities, high tensile strength and improved tear resistance, including a vulcanizable synthetic elastomeric copolymer of butadiene and acrylonitrile, a vulcanizing agent for said copolymer, a vulcanization accelerator for said agent, carbon black having a particle size substantially within the range of 0.02 micron to 1 micron, the weight ratio of said carbon black to said copolymer being substantially within the range of 1:1 to 1.25:1, and a solid chlorinated paraffin wax having 69% to 71%, inclusive, of chemically combined chlorine, the weight ratio of said chlorinated paraffin wax to said elastomer being substantially 0.85:1.

21. A synthetic elastomer composition of improved processing qualities, high tensile strength and improved tear resistance, including a vulcanizable synthetic elastomeric polymer of 2-chlorobutadiene, a vulcanizing agent for said polymer, a vulcanization acceleration for said agent, an inorganic loading material including a mixture of carbon black and calcium carbonate having a particle size of the order of 1 micron, the weight ratio of said mixture to said polymer being substantially 2.3:1, and a solid chlorinated paraffin wax having 69% to 71%, inclusive, of chemically combined chlorine, the weight ratio of said chlorinated paraffin wax to said elastomer being substantially within the range of 0.3–0.5:1.

22. A synthetic elastomer composition of improved processing qualities, high tensile strength, and improved tear resistance, including a mixture of a synthetic elastomeric copolymer of butadiene and styrene with whole time reclaimed rubber, a vulcanizing agent for said copolymer and said reclaimed rubber, a vulcanization accelerator for said agent, an inorganic loading material consisting essentially of a mixture of clay, calcium carbonate, and carbon black, said loading material having a particle size within the range of 1–15 microns, the weight ratio of said loading material to the combined weight of said elastomer and rubber hydrocarbon of said reclaimed rubber being substantially within the range of 2.25–2.6:1, and a solid chlorinated paraffin wax containing 69% to 71%, inclusive, of chemically combined chlorine, the weight ratio of said chlorinated paraffin wax to the combined weights of said elastomer and said rubber hydrocarbon being substantially within the range of 0.3–0.4:1.

23. A synthetic elastomer composition of improved processing qualities, high tensile strength, and improved tear resistance, including mixtures of synthetic elastomeric material selected from the group consisting of polymers of 2-chlorobutadiene, copolymers of butadiene and styrene, and copolymers of butadiene and acrylonitrile, a vulcanization agent for said elastomeric material, a vulcanization accelerator for said agent, inorganic loading materials selected from the group consisting of clay, silica, calcium carbonate, and antimony oxide, the weight ratio of said loading materials to said elastomeric material being substantially within the range of 1.35–2.5:1, and a solid chlorinated paraffin wax containing 69% to 71%, inclusive, of chemically combined chlorine, the weight ratio of chlorinated paraffin wax to said elastomer material being substantially within the range of 0.7–0.85:1.

References Cited in the file of this patent
UNITED STATES PATENTS

| | | |
|---|---|---|
| 2,138,192 | Ott | Nov. 29, 1938 |
| 2,480,298 | Happoldt | Aug. 30, 1949 |
| 2,545,977 | Smith | Mar. 20, 1951 |
| 2,590,211 | Rugar | Mar. 25, 1952 |
| 2,669,521 | Bierly | Feb. 16, 1954 |
| 2,727,874 | Peterson et al. | Dec. 20, 1955 |